US012315450B2

(12) United States Patent
Miyata

(10) Patent No.: US 12,315,450 B2
(45) Date of Patent: May 27, 2025

(54) DISPLAY DEVICE AND METHOD FOR CONTROLLING DISPLAY DEVICE

(71) Applicant: Sharp Display Technology Corporation, Kameyama (JP)

(72) Inventor: Hidekazu Miyata, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/602,194

(22) Filed: Mar. 12, 2024

(65) Prior Publication Data

US 2024/0355282 A1 Oct. 24, 2024

(30) Foreign Application Priority Data

Apr. 19, 2023 (JP) ................................ 2023-068373

(51) Int. Cl.
*G09G 3/3233* (2016.01)

(52) U.S. Cl.
CPC ... *G09G 3/3233* (2013.01); *G09G 2300/0413* (2013.01); *G09G 2300/0819* (2013.01); *G09G 2300/0852* (2013.01); *G09G 2310/0262* (2013.01); *G09G 2310/08* (2013.01); *G09G 2320/0233* (2013.01); *G09G 2320/045* (2013.01); *G09G 2330/026* (2013.01); *G09G 2330/027* (2013.01); *G09G 2330/028* (2013.01)

(58) Field of Classification Search
None
See application file for complete search history.

(56) References Cited

U.S. PATENT DOCUMENTS

2012/0287025 A1 11/2012 Inoue et al.

FOREIGN PATENT DOCUMENTS

CN 111383600 A * 7/2020 ............... G09G 3/32
JP 2012-252329 A 12/2012

OTHER PUBLICATIONS

Translation of CN-111383600-A into English, Ji et al. (Year: 2020).*

* cited by examiner

*Primary Examiner* — Brian M Butcher
(74) *Attorney, Agent, or Firm* — ScienBiziP, P.C.

(57) ABSTRACT

A display device includes a light-emitting element, a first transistor, a second transistor, a third transistor, a drive circuit, and a voltage compensation circuit. The drive circuit supplies, in an initial period, an initial voltage to a gate electrode of the first transistor, and supplies a data signal to the first electrode in a write period succeeding the initial period, and turns ON the third transistor. The voltage compensation circuit includes a first capacitive element, a second capacitive element, a first switch, and a second switch. The voltage compensation circuit switches, when the write period starts, from the state in which the second switch is ON to the state in which the second switch is OFF, and turns ON the first switch after the write period starts. The drive circuit turns ON the second transistor in a light ON period succeeding the turning ON of the first switch.

6 Claims, 15 Drawing Sheets

10

FIRST COMPARATIVE EXAMPLE

DISPLAY DEVICE AND METHOD FOR CONTROLLING DISPLAY DEVICE

CROSS-REFERENCE TO RELATED APPLICATIONS

This application claims the benefit of priority to Japanese Patent Application Number 2023-068373 filed on Apr. 19, 2023. The entire contents of the above-identified application are hereby incorporated by reference.

BACKGROUND

Technical Field

The present disclosure relates to a display device and a method for driving the display device.

Japanese Unexamined Patent Application Publication No. 2012-252329 discloses an active matrix display device including: an organic EL element; a first transistor; a second transistor; and a capacitor. The first transistor is a transistor for controlling a current to be supplied to the organic EL element. The second transistor is connected between the first transistor and the organic EL element. The capacitor is connected to a gate electrode of the first transistor. Here, the gate electrode of the first transistor is supplied with a first voltage higher than a voltage of a gate signal. After that, a data signal is supplied (written) to a first electrode of the first transistor. The gate electrode and a second electrode of the first transistor are connected together. When a period in which a data signal is written (hereinafter referred to as a "write period") starts, a current flows from the second electrode to the first electrode. Accordingly, a potential of the gate electrode starts to drop from the first voltage. After the write period starts, the potential of the gate electrode is held by the capacitor at a value higher than, or equal to, a value of the sum of a voltage of the data signal and a gate threshold voltage of the first transistor.

SUMMARY

Here, in the active matrix display device of Japanese Unexamined Patent Application Publication No. 2012-252329, if the potential of the gate electrode matches a value of the sum of the voltage of the data signal and the gate threshold voltage of the first transistor (hereinafter referred to as a "target voltage value") during the write period, only the gate threshold voltage represents the potential difference between the gate electrode and the first electrode of the first transistor. Thus, no current flows between the gate electrode and the first electrode. In such a case, the active matrix display device can reduce variations in luminance caused by variations in the gate threshold voltage of the first transistor.

However, a magnitude of the current flowing from the second electrode to the first electrode of the first transistor is proportional to the square of the potential difference between the potential of the gate electrode and the potential of the first electrode. That is, the closer the potential of the gate electrode is toward the target voltage value, the smaller the current is. Accordingly, the potential drop becomes slower. Hence, during the write period, the potential of the gate electrode does not reach the target voltage value.

The present disclosure provides a display device capable of reducing luminance variations caused by a transistor that controls a current flowing in a light-emitting element, and a method for controlling the display device.

In order to solve the above problems, a display device according to a first aspect of the present disclosure includes: a light-emitting element; a first transistor controlling a current flowing in the light-emitting element; a second transistor connected between the light-emitting element and a first electrode that is one of a source electrode of the first transistor or a drain electrode of the first transistor; a third transistor connected between a gate electrode of the first transistor and a second electrode that is another one of the source electrode of the first transistor or the drain electrode of the first transistor; a drive circuit supplying the data signal to the first electrode in a write period succeeding the initial period, and turning ON the third transistor a data signal to the first electrode; and a voltage compensation circuit connected to the gate electrode of the first transistor. The drive circuit: supplies, in an initial period, an initial voltage to the gate electrode of the first transistor, the initial voltage being different in voltage value from a voltage of the data signal; and supplies the data signal to the first electrode in a write period succeeding the initial period, and turns ON the third transistor. The voltage compensation circuit includes: a first capacitive element connected to the gate electrode; a second capacitive element connected to the first capacitive element; a first switch connected to the gate electrode and to the second capacitive element, and turning ON to electrically connect together the first capacitive element and the second capacitive element in parallel; and a second switch switching between: a state in which the gate electrode of the first transistor and a voltage source that supplies the initial voltage are electrically connected together; and a state in which the gate electrode of the first transistor and the voltage source are electrically disconnected from each other. The voltage compensation circuit: switches, when the write period starts, from the state in which the second switch is ON to electrically connect together the gate electrode of the first transistor and the voltage source to the state in which the second switch is OFF to electrically disconnect the gate electrode of the first transistor and the voltage source from each other; and turns ON the first switch after the write period starts. The drive circuit turns ON the second transistor in a light ON period succeeding the turning ON of the first switch.

Furthermore, as to a method for controlling a display device according to a second aspect, the display device includes: a light-emitting element; a first transistor configured to control a current flowing in the light-emitting element; a second transistor connected between the light-emitting element and a first electrode that is one of a source electrode of the first transistor or a drain electrode of the first transistor; a third transistor connected between a gate electrode of the first transistor and a second electrode that is another one of the source electrode of the first transistor or the drain electrode of the first transistor; a drive circuit supplying a data signal to the first electrode; and a voltage compensation circuit connected to the gate electrode of the first transistor. The voltage compensation circuit includes: a first capacitive element connected to the gate electrode; a second capacitive element connected to the first capacitive element; a first switch connected to the gate electrode and to the second capacitive element, and turning ON to electrically connect together the first capacitive element and the second capacitive element in parallel; and a second switch switching between: a state in which the gate electrode of the first transistor and a voltage source that supplies an initial voltage are electrically connected together; and a state in which the gate electrode of the first transistor and the voltage source are electrically disconnected from each other, the initial voltage being different in voltage value from a voltage of the data signal, The method includes: supplying, in an initial period, the initial voltage to the gate electrode of the first transistor; supplying the data signal to the first electrode in a write period succeeding the initial period, and turning ON the third transistor, switching, when the write period starts, from the state in which the second switch is ON to electrically connect together the gate electrode of the first transistor and the voltage source to the state in which the second switch is OFF to electrically disconnect the gate electrode of the first transistor and the voltage source from each other; turning ON the first switch after the write period starts, and turning the second switch ON in a light ON period succeeding after the turning ON of the first switch.

According to the above configuration, after the write period starts, the charges can flow from the gate electrode of the first transistor to the second capacitive element. The charges flowing into the second capacitive element can quickly decrease the potential of the gate electrode of the first transistor. The quick decrease in the potential of the gate electrode can bring the potential close to a value of the sum of the voltage of the data signal and the gate threshold voltage of the first transistor. Such a feature can reduce luminance variations caused by a transistor that controls a current flowing in the light-emitting element.

DESCRIPTION OF EMBODIMENTS

Figure 1:
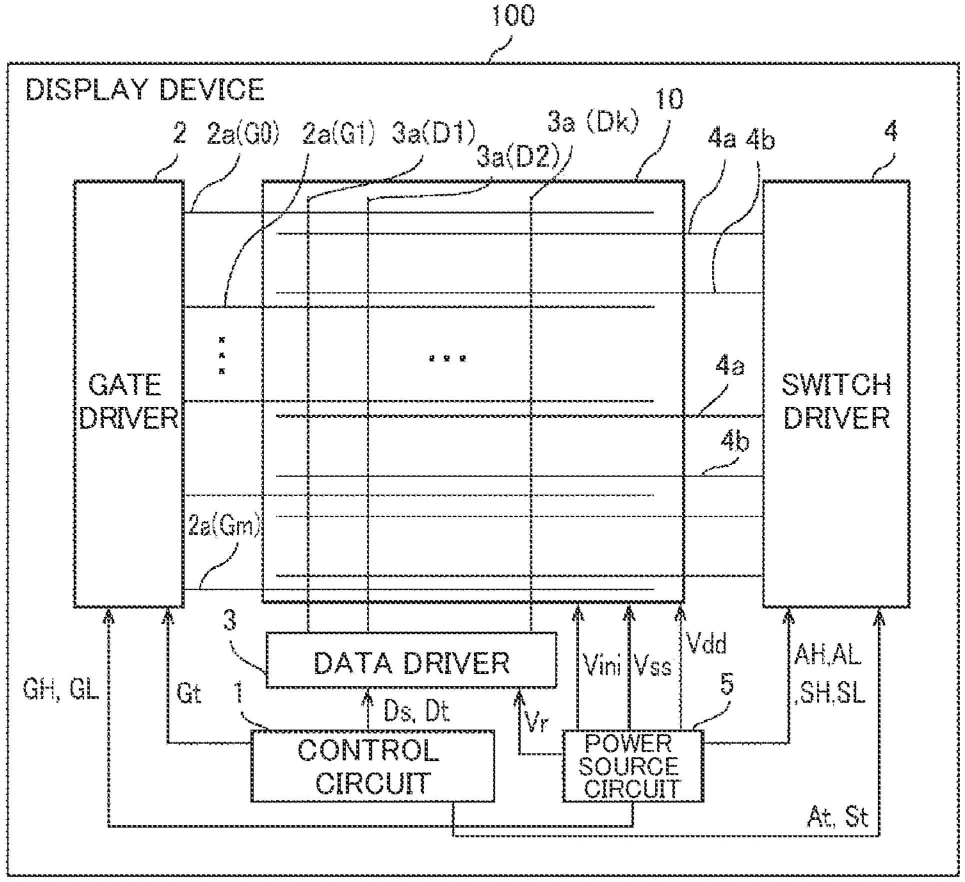
FIG. 1 is a block diagram illustrating a configuration of a display device 100 according to a first embodiment.

Described below in detail are embodiments of the present disclosure, with reference to the drawings. In the drawings, the same or corresponding portions are denoted by the same reference numerals, and the description thereof will not be repeated. For the sake of convenience, the drawings below are simplistically or schematically illustrated. In the drawings, some of the constituent members may be omitted. In addition, the dimensional ratios between the constituent members in the drawings are not necessarily the actual dimensional ratios.

First Embodiment

FIG. 1 is a block diagram illustrating a configuration of a display device 100 according to a first embodiment. The display device 100 is an active matrix display in which light-emitting elements 11 are arranged in a matrix.

As illustrated in FIG. 1, the display device 100 includes: a control circuit 1; a gate driver 2; a data driver 3; a switch driver 4; a power source circuit 5; and a display unit 10. Furthermore, the display device 100 includes: a plurality of gate lines 2*a* (e.g., m gate lines 2*a* where m is a natural number) connected to the gate driver 2; a plurality of data lines 3*a* (e.g., k data lines 3*a* where k is a natural number) connected to the data driver 3; a plurality of assist lines 4*a* (e.g., m assist lines 4*a* where m is a natural number) connected to the switch driver 4; and a plurality of switch lines 4*b* (e.g., m switch lines 4*b* where m is a natural number) connected to the switch driver 4. The plurality of gate lines 2*a* and the plurality of data lines 3*a* define regions referred to as pixels. The display unit 10 includes k×m pixels.

Figure 2:
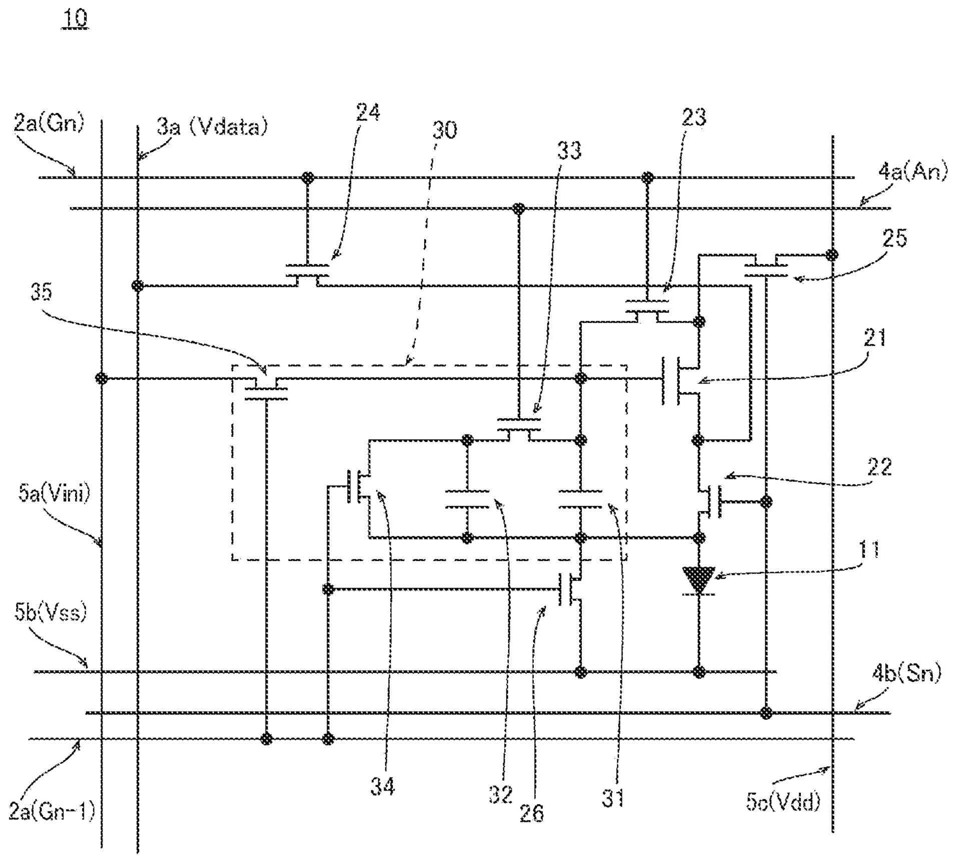
FIG. 2 is a circuit diagram illustrating a partial configuration of a display unit 10.

FIG. 2 is a circuit diagram illustrating a partial configuration of the display unit 10. As illustrated in FIG. 2, the assist line 4*a* is a control line that controls an operation of a voltage compensation circuit 30 (a transistor 33) in order to assist a write of a data signal Vdata to a transistor 21. The switch line 4*b* is a control line that causes a transistor 22 to control ON and OFF of the light-emitting element 11.

Note that, in FIG. 1, the gate lines are denoted by reference signs G1 to Gm to distinguish between the m gate lines 2*a*. A given n-th gate line is denoted by a reference sign Gn. Note that, as illustrated in FIG. 1, the display device 100 may be provided with a gate line G0 (a dummy line) that does not contribute to emission of light from the light-emitting element 11. Furthermore, in order to distinguish between the k data lines 3*a*, the data lines are denoted by reference signs D1 to Dk.

The control circuit 1 illustrated in FIG. 1 includes a processor that executes each control process of the display device 100. The control circuit 1 outputs a timing signal Gt for outputting a gate signal to the gate driver 2. Furthermore, the control circuit 1 outputs a timing signal Dt and a digital data signal Ds to the data driver 3. The timing signal Dt is a signal for outputting a data signal. The digital data signal Ds is a data signal represented by a digital value. Moreover, the control circuit 1 outputs a timing signal St and a timing signal At to the switch driver 4. The timing signal St is a signal for controlling timing of the light-emitting element 11 emitting light. The timing signal At is a signal for controlling an operation of the voltage compensation circuit 30 (the transistor 33). In addition, the control circuit 1 generates the timing signals Gt, Dt, St, and At, and the digital data signal Ds, in accordance with an image signal received from a not-shown host controller.

The gate driver 2 is a circuit that outputs a gate signal to the plurality of gate lines 2*a*. For example, the gate driver 2 is an integrated circuit mounted on a not-shown substrate of the display device 100. Note that the gate driver 2 may be monolithically formed on the substrate. Then, the gate driver 2 receives the timing signal Gt from the control circuit 1. The timing signal Gt controls the timing of the gate signal to be output. Furthermore, in accordance with the timing signal Gt, the gate driver 2 supplies voltages GH and GL, supplied from the power source circuit 5, to the plurality of gate lines 2*a*.

Figure 3:
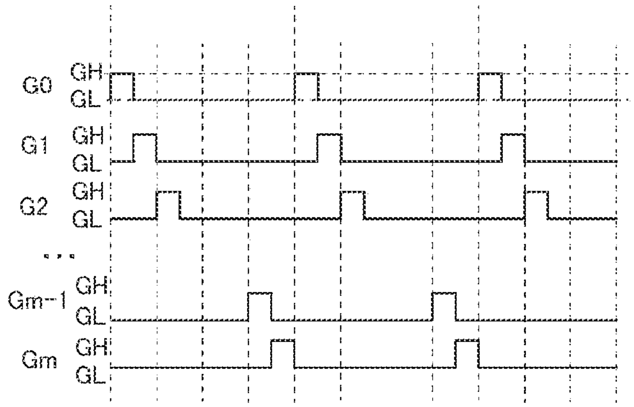
FIG. 3 is a diagram showing a gate signal supplied to a plurality of gate lines 2*a;*
Figure 4:
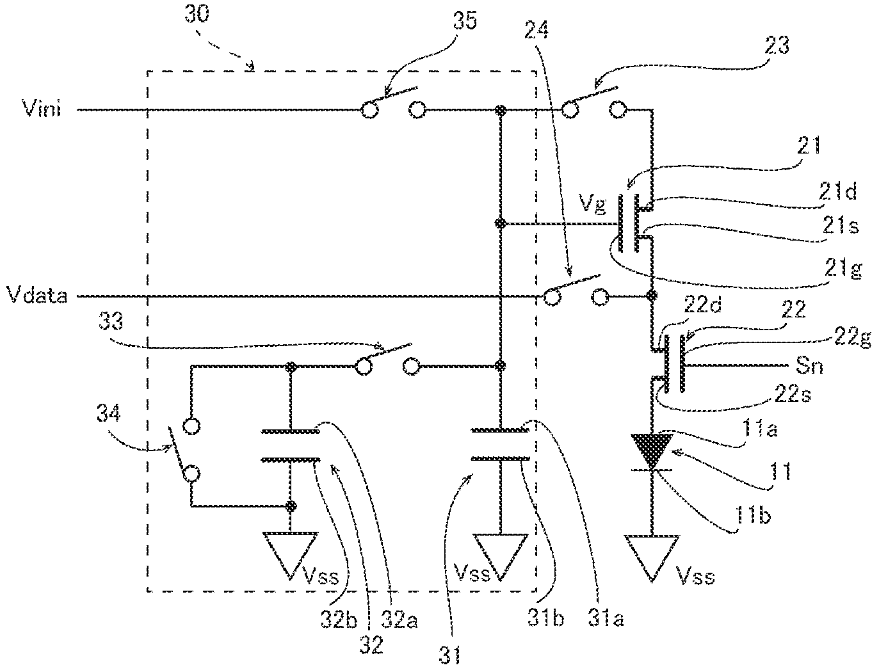
FIG. 4 is a circuit diagram illustrating a configuration of a voltage compensation circuit 30 according to the first embodiment.
Figure 5:
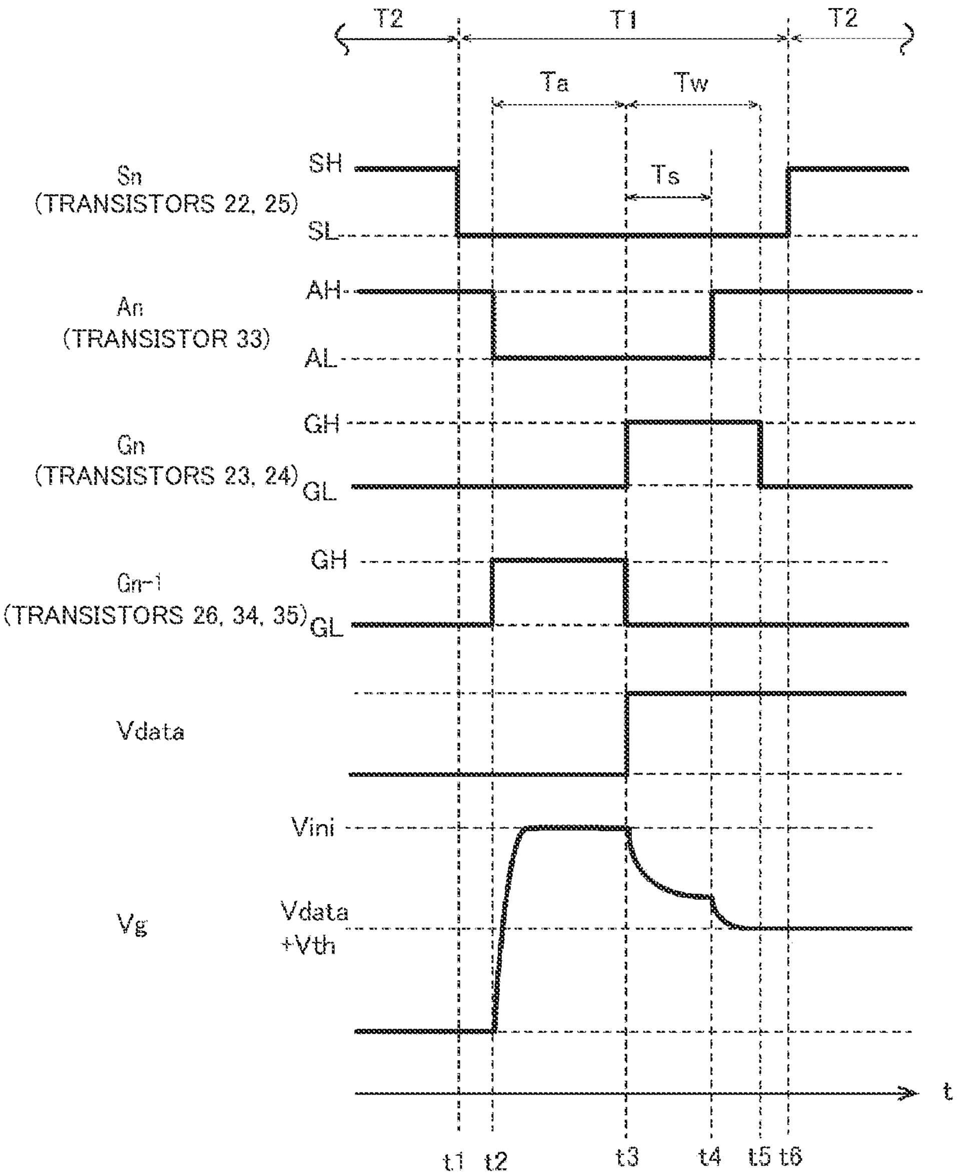
FIG. 5 is a timing diagram showing an operation of the display device 100 according to the first embodiment.

FIG. 3 is a diagram showing a gate signal supplied to a plurality of gate lines 2*a*. FIG. 4 is a circuit diagram illustrating a configuration of the voltage compensation circuit 30 according to the first embodiment. FIG. 5 is a timing diagram showing an operation of the display device 100 according to the first embodiment. As shown in FIG. 5, in a period while the transistor 24 of the display unit 10 is ON (i.e., turns ON), the gate driver 2 supplies a voltage VH to each of the gate lines 2*a*. In a period while the transistor 24 of the display unit 10 is OFF (i.e., turns OFF), the gate driver 2 supplies a voltage VL to each of the gate lines 2*a*. As illustrated in FIG. 3, the gate driver 2 sequentially supplies the voltage VH to the gate lines G0 to Gm.

The data driver 3 is a circuit that outputs a data signal to the plurality of data lines 3*a*. For example, the data driver 3 is an integrated circuit mounted on a not-shown substrate of the display device 100. Note that the data driver 3 may be monolithically formed on the substrate. The data driver 3 receives the digital data signal Ds and the timing signal Dt from the control circuit 1. The timing signal Dt controls the timing of the digital data signal Ds to be output. Furthermore, the data driver 3 receives a voltage Vr from the power source circuit 5. The voltage Vr is a voltage for converting the input digital data signal Ds into analog data (a voltage). The voltage Vr is a voltage that serves as a reference for a predetermined grayscale. In accordance with the voltage Vr, the data driver 3 converts the digital data signal Ds into a voltage value (a data signal). Then, in accordance with the timing signal Dt, the data driver 3 outputs the data signal to each of the data lines 3*a*.

The switch driver 4 is a circuit that outputs a control signal to the plurality of assist lines 4*a* and the plurality of switch lines 4*b*. For example, the switch driver 4 is an integrated circuit mounted on a not-shown substrate of the display device 100. Note that the switch driver 4 may be monolithically formed on the substrate. The switch driver 4 receives the timing signals At and St from the control circuit 1. The timing signals At and St control timing of the control signal to be output. Then, the switch driver 4 receives voltages AH, AL, SH, and SL from the power source circuit 5.

As shown in FIG. 5, in a period while the transistor 33 of the voltage compensation circuit 30 is ON (i.e., turns ON), the switch driver 4 supplies the voltage VH to each of the assist lines 4*a* in accordance with the timing signal At. In a period while the transistor 33 of the voltage compensation circuit 30 is OFF (i.e., turns OFF), the switch driver 4 supplies the voltage VL to each of the assist lines 4*a* in accordance with the timing signal At. Furthermore, in a period while the transistor 22 of the display unit 10 is ON (i.e., turns ON), the switch driver 4 supplies a voltage SH to each of the switch lines 4*b* in accordance with the timing signal St. In a period while the transistor 22 of the display unit 10 is OFF (i.e., turns OFF), the switch driver 4 supplies a voltage SL to each of the switch lines 4*b* in accordance with the timing signal St.

The power source circuit 5 outputs a voltage Vss, a voltage Vdd, and a voltage Vini that serve as reference voltages for the control of the display unit 10. The voltage Vss is a voltage to be supplied to a cathode of the light-emitting element 11. The voltage Vdd is a voltage to be supplied to an anode of the light-emitting element 11 when the light-emitting element 11 emits light. The voltage Vini is higher than the voltage Vss, and is higher in voltage value than the data signal Vdata. The voltage Vini is a voltage (an initialization voltage) to be applied before the data signal Vdata is written to the transistor 21.

For example, the voltage Vini is set to have a value higher than, or equal to, a value of a sum of: a voltage value Vdata(max) of the data signal with which the light-emitting element 11 has the maximum luminance value; and a gate threshold voltage Vth. The gate threshold voltage is set to be higher than Vth (max), which is the highest voltage value among variations in the gate threshold voltage of the transistor 21 in the display unit 10. Furthermore, the voltage Vini is set to a value higher by a predetermined voltage V0 (Vini=Vdata(max)+Vth (max)+V0). For example, the voltage V0 is 0.5 V.

(Configuration of Display Unit 10)

As illustrated in FIG. 2, each of the pixels in the display unit 10 is provided with: the light-emitting element 11; the transistors 21 to 26; and the voltage compensation circuit 30. The light-emitting element 11 has diode characteristics. The luminance of the light-emitting element 11 is higher as the current flows more from an anode 11*a* (see FIG. 4) to a cathode 11*b* (see FIG. 4) of the light-emitting element 11. The light-emitting element 11 is, for example, a light-emitting diode. The light-emitting diode may be, for example, a uLED, a mini LED, or an organic EL element (OLED). That is, the display device 100 is a uLED display, a mini-LED display, or an organic EL display. The anode 11*a* is connected to the transistor 22. The cathode 11*b* is connected to a power line 5*b* to which the voltage Vss is applied. The power line 5*b* is connected to the power source circuit 5 (see FIG. 1).

In the first embodiment, the transistors 21 to 26 are n-channel transistors. A semiconductor included in each of the transistors 21 to 26 is, for example, an oxide semiconductor. The oxide semiconductor may contain, for example, In, Ga, and Zn. Furthermore, the semiconductor included in each of the transistors 21 to 26 may be made of low-temperature polycrystalline silicon (LTPS) or amorphous silicon.

The transistor 21 illustrated in FIG. 4 is a switch element that controls a current flowing through the light-emitting element 11. In the transistor 21, the larger a potential difference is between a potential of a gate electrode 21*g* and a potential of a source electrode 21*s*, the more the current flows from a drain electrode 21*d* toward the source electrode 21*s*.

The transistor 22 is a switch element that switches between an ON state and an OFF state of the light-emitting element 11. As illustrated in FIG. 4, the transistor 22 has a drain electrode 22*d* connected to the source electrode 21*s* of the transistor 21. The transistor 22 has a source electrode 22*s* connected to the anode 11*a* of the light-emitting element 11. The transistor 22 has a gate electrode 22*g* connected to a switch line 4*b*. When the transistor 22 is in the ON state (i.e., when the gate electrode 22*g* is in a state of having the voltage SH), a current flows through the light-emitting element 11. When the transistor 22 is in the OFF state (i.e., when the gate electrode 22*g* is in a state of having the voltage SL), no current flows through the light-emitting element 11.

The transistor 23 is a switch element that switches between: a state in which the gate electrode 21*g* and the drain electrode 21*d* of the transistor 21 are electrically connected together; and a state in which the gate electrode 21*g* and the drain electrode 21*d* of the transistor 21 are electrically disconnected from each other. The transistor 23 has a gate electrode connected to a gate line 2*a*. The transistor 23 turns ON when the gate signal is the voltage GH, and electrically connects together the gate electrode 21*g* and the drain electrode 21*d* of the transistor 21. The transistor 23 turns OFF when the gate signal is the voltage GL, and electrically disconnects, from each other, the gate electrode 21*g* and the drain electrode 21*d* of the transistor 21.

The transistor 24 is a switch element that supplies (writes) the data signal Vdata to the source electrode 21*s* of the transistor 21 in accordance with the gate signal. The transistor 24 has a gate electrode connected to the gate line 2*a*. The transistor 24 turns ON when the gate signal is the voltage GH, and electrically connects together the data line 3*a* and the source electrode 21*s* of the transistor 21. The transistor 24 turns OFF when the gate signal is the voltage GL, and electrically disconnects, from each other, the data line 3*a* and the source electrode 21*s*.

The transistor 25 is a switch element for applying the voltage Vdd to the drain electrode 21*d* of the transistor 21 when the light-emitting element 11 emits light. The transistor 25 has a gate electrode connected to the switch line 4*b*. The transistor 25 has a drain electrode connected to a power line 5*c* to which the voltage Vdd is applied. The power line 5*c* is connected to the power source circuit 5 (see FIG. 1). The transistor 25 has a source electrode connected to the drain electrode 21*d* of the transistor 21. Then, when the transistor 25 is in an ON state (i.e., when the voltage SH is applied to the gate electrode), the transistor 25 supplies the voltage Vdd to the drain electrode 21*d* of the transistor 21. When the transistor 25 is in an OFF state (i.e., when the voltage SL is applied to the gate electrode), the transistor 25 electrically disconnects, from each other, the power line 5*c* and the drain electrode 21*d* of the transistor 21.

The transistor 26 is a switch element that switches between states in which the voltage compensation circuit 30 and the power line 5*b* are electrically connected together and electrically disconnected from each other. Furthermore, the transistor 26 is a switch element that switches between states in which the anode 11*a* and the cathode 11*b* of the light-emitting element 11 are short-circuit and electrically disconnected from each other. The transistor 26 has a gate electrode connected to a gate line 2*a* of the preceding stage (n−1). The transistor 26 has a drain electrode connected to a capacitive element 31 and a capacitive element 32 of the voltage compensation circuit 30, and to the anode 11*a* of the light-emitting element 11. The transistor 26 has a source electrode connected to the power line 5*b* to which the voltage Vss is applied, and to the cathode 11*b* of the light-emitting element 11. Then, when the gate line 2*a* of the preceding stage (n−1) has the voltage GH, the transistor 26 connects the anode 11*a*, the capacitive element 31, and the capacitive element 32 to the power line 5*b* and the cathode 11*b*. When the gate line 2*a* of the preceding stage (n−1) has the voltage GL, the transistor 26 electrically disconnects the anode 11*a*, the capacitive element 31, and the capacitive element 32 from the power line 5*b* and the cathode 11*b*.

(Configuration of Voltage Compensation Circuit 30)

The voltage compensation circuit 30 is a circuit that corrects to bring a voltage Vg of the gate electrode 21*g* of the transistor 21 close to the sum of the data signal Vdata and the gate threshold voltage Vth, in order to reduce variations caused by variations in the gate threshold voltage Vth of the transistor 21 and observed in the magnitude of the current flowing through the light-emitting element 11.

As illustrated in FIG. 4, the voltage compensation circuit 30 is connected to the gate electrode 21*g* of the transistor 21. The voltage compensation circuit 30 includes: the capacitive elements 31 and 32; and transistors 33 to 35. In the first embodiment, the transistors 33 to 35 are n-channel transistors. A semiconductor included in each of the transistors 33 to 35 is, for example, an oxide semiconductor. The oxide semiconductor may contain, for example, In, Ga, and Zn. Furthermore, the semiconductor included in each of the transistors 33 to 35 may be made of low-temperature polycrystalline silicon (LTPS) or amorphous silicon.

The capacitive element 31 has an electrode 31*a* connected to the gate electrode 21*g* of the transistor 21. Furthermore, as illustrated in FIG. 2, the capacitive element 31 has an electrode 31*b* connected to the transistor 26 and to the anode 11*a* of the light-emitting element 11. The capacitive element 32 has an electrode 32*a* connected at one end to the transistor 33 and to the transistor 34. Moreover, the capacitive element 32 has an electrode 32*b* connected at another end to the transistor 34. In addition, in the first embodiment, the capacitive element 31 is larger in capacitance than the capacitive element 32. Such a feature can reduce a time period of charges moving from the gate electrode 21*g* to the capacitive element 32, which will be described later.

The transistor 33 is a switch element that switches between: a state in which the capacitive element 31 and the capacitive element 32 are connected together in parallel with respect to the gate electrode 21*g*; and a state in which the capacitive element 32 and the gate electrode 21*g* are electrically disconnected from each other (i.e., a state in which only the capacitive element 31 is connected to the gate electrode 21*g*). As illustrated in FIG. 2, the gate electrode of the transistor 33 is connected to the assist line 4*a*. As illustrated in FIG. 4, the drain electrode of the transistor 33 is connected to the electrode 31*a* of the capacitive element 31 and to the gate electrode 21*g*. The source electrode of the transistor 33 is connected to the electrode 32*a* of the capacitive element 32. Thanks to such features, when the voltage AH is applied from the assist line 4*a* to the gate electrode of the transistor 33, the capacitive element 31 and the capacitive element 32 are connected together in parallel with respect to the gate electrode 21*g*. When the voltage AL is applied from the assist line 4*a* to the gate electrode of the transistor 33, the gate electrode 21*g* and the capacitive element 32 are electrically disconnected from each other, and the capacitive element 31 is connected to the gate electrode 21*g*.

The transistor 34 is a switch element for short-circuiting the capacitive element 32 in a period before the write period starts. As illustrated in FIG. 2, the transistor 34 has a gate electrode connected to the gate line 2*a* of the preceding stage (n−1). The transistor 34 has a drain electrode connected to the electrode 32*a* of the capacitive element 32. The transistor 34 has a source electrode connected to the electrode 32*b* of the capacitive element 32. Thanks to such features, when the voltage GH is applied to the gate line 2*a* of the preceding stage (n−1), the electrode 32*a* and the electrode 32*b* of the capacitive element 32 short-circuit. Furthermore, when the voltage GL is applied to the gate line 2*a* of the preceding stage (n−1), the electrode 32*a* and the electrode 32*b* of the capacitive element 32 are electrically disconnected from each other. Note that the "write period" is a period in which the data signal Vdata is written to the source electrode 21*s* of the transistor 21.

The transistor 35 is a switch element that switches between: a state in which the gate electrode 21*g* of the transistor 21 and a power line 5*a* (the power source circuit 5) to which the voltage Vini is applied are electrically connected together; and a state in which the gate electrode 21*g* of the transistor 21 and the power line 5*a* to which the voltage Vini is applied are electrically disconnected from each other. The transistor 35 has a gate electrode connected to the gate line 2*a* of the preceding stage (n−1). The transistor 35 has a drain electrode connected to the power line 5*a*. The transistor 35 has a source electrode connected to the gate electrode 21*g*. Thanks to such features, when the voltage GH is applied to the gate line 2*a* of the preceding stage (n−1), the voltage Vini is applied to the gate electrode 21*g*. Furthermore, when the voltage GL is applied to the gate line 2*a* of the preceding stage (n−1), the power line 5*a* and the gate electrode 21*g* are electrically disconnected from each other.

(Method For Controlling Display Device 100)

Next, a method for controlling the display device 100 will be described with reference to FIGS. 2, 4, and 5. In particular, an operation of one pixel will be described. The one pixel is connected to an n-th gate line 2*a* in the display unit 10 where n is a natural number.

As shown in FIG. 5, a light OFF period T1 starts at a time point t1. The light OFF period T1 is a period provided immediately before a light ON period T2 in order to change luminance of emitted light. Note that FIG. 5 shows the light OFF period with emphasis. However, the light OFF period T1 is shorter than the light ON period T2 by an order of magnitude. Furthermore, in the light OFF period T1, the light-emitting element 11 is not ON. In the light ON period T2, the light-emitting element 11 is ON. In the light OFF period T1, the switch line 4*b* is supplied with the control signal having the voltage SL. In the light ON period T2, the switch line 4*b* is supplied with the control signal having the voltage SH. At the time point t1, the transistors 22 and 25 are OFF. Hence, a current from the transistor 21 to the light-emitting element 11 stops, and the light-emitting element 11 turns OFF.

At a time point t2, an initial period Ta starts. The initial period Ta is a period in which the charges carried in the capacitive element 32 are discharged. In the first embodiment, the initial period Ta is timed to coincide with a write period Tw of the preceding stage (n−1). That is, the initial period Ta is a period in which the gate signal (the voltage GH) is supplied to the gate line 2*a* of the preceding stage (n−1). In the initial period Ta, the transistors 26, 34, and 35 are ON. As a result, the electrodes 32*a* and 32*b* of the capacitive element 32 are short-circuited, and a potential difference becomes 0 between the potential of the electrode 32*a* and the potential of the electrode 32*b*. Furthermore, the electrode 31*b* of the capacitive element 31 and the electrode 32*b* of the capacitive element 32 are connected to the power line 5*b*, and the potentials of the electrode 31*b* and the electrode 32*b* become Vss.

Moreover, at the time point t2, the gate electrode 21*g* of the transistor 21 is electrically connected to the power line 5*a*, and the potential of the gate electrode 21*g* rises toward Vini. Then, during the initial period Ta, the potential of the gate electrode 21*g* reaches *Vini*.

Furthermore, at the time point t2, the voltage of the control signal supplied to the assist line 4*a* is switched from AH to AL. Hence, the transistor 33 electrically disconnects the capacitive element 32 from the gate electrode 21*g* and the capacitive element 31.

At a time point t3, the write period Tw and a standby period Ts start. The standby period Ts is a period in which the start of the flow of the charges from the gate electrode 21*g* to the capacitive element 32 delays with respect to the time point t3 at which the write period Tw starts. In the first embodiment, the write period Tw and the standby period Ts start simultaneously, and the standby period Ts ends before the write period Tw.

At time point t3, the voltage of the gate signal of the gate line 2*a* in the preceding stage (n−1) changes from GH to GL, and the voltage of the gate signal of the n-th gate line 2*a* changes from GL to GH. As a result, the transistor 26 turns OFF, and the anode 11*a* and the cathode 11*b* of the light-emitting element 11 are not short-circuited. The transistor 34 turns OFF, and the electrodes 32*a* and 32*b* of the capacitive element 32 are not short-circuited. Furthermore, the transistor 35 turns OFF, and the gate electrode 21*g* and the power line 5*a* for supplying the voltage Vini are electrically disconnected from each other.

Then, the transistors 23 and 24 turn ON, the data signal Vdata is applied to the source electrode 21*s* of the transistor 21, and the drain electrode 21*d* and the gate electrode 21*g* of the transistor 21 are electrically connected. Because the voltage Vini is higher than the voltage Vdata(max), a current flows from the drain electrode 21*d* to the source electrode 21*s* of the transistor 21. Hence, the gate voltage Vg of the gate electrode 21*g* drops from Vini toward a value of the sum of Vdata and the gate threshold voltage Vth (Vdata+Vth). However, when the gate voltage Vg comes closer to Vdata+Vth, the current (the gate-source current) becomes smaller in proportion to the square of a potential difference Vgs between the gate voltage and the voltage of the source electrode 21*s*. When the gate-source current is I, a relationship of Equation (1) holds. Wherein u is a mobility, W is a channel width, L is a channel length, and C0 is a capacitance per unit area of an insulator between the gate electrode and the semiconductor.

$$I = 1/2 \times \mu \times W/L \times C0 \times (Vgs - Vth)^2. \quad (1)$$

Hence, the gate voltage Vg does not reach Vdata+Vth.

At a time point t4, the standby period Ts ends. At the time point t4, the voltage of the control signal supplied to the assist line 4*a* changes from AL to AH. Hence, the transistor 33 turns ON, and the capacitive element 31 and the capacitive element 32 are connected together in parallel with respect to the gate electrode 21*g*. As a result, the charges flow from the gate electrode 21*g* into the capacitive element 31, and the gate voltage Vg of the gate electrode 21*g* comes more closely to, and reaches, Vdata+Vth.

At a time point t5, the write period Tw ends. At the time point t5, the voltage of the gate signal to be supplied to the n-th gate line 2*a* changes from GH to GL. Hence, the transistors 23 and 24 turn OFF. Thus, the source electrode 21*s* of the transistor 21 and the data line 3*a* are electrically disconnected from each other, and the drain electrode 21*d* and the gate electrode 21*g* of the transistor 21 are electrically disconnected from each other.

At a time point t6, a light ON period T2 starts. At the time point t6, the voltage of the control signal supplied to the switch line 4*b* changes from SL to SH. As a result, the transistor 25 turns ON, and the voltage Vdd is applied to the drain electrode 21*d* of the transistor 21. Then, the transistor 22 turns ON, and the current from the transistor 21 flows into the light-emitting element 11. Here, the magnitude of the current flowing into the light-emitting element 11 changes depending on the magnitude of the gate voltage Vg of the light-emitting element 11. After the light ON period T2 ends, the light OFF period T1 starts.

Thanks to the above control method, the gate voltage Vg of the gate electrode 21*g* is close to a value of Vdata+Vth. Such a feature can reduce luminance variations caused by the transistor 21 that controls a current flowing in the light-emitting element 11. Furthermore, the first embodiment can bring the potential of the gate electrode 21*g* close to Vdata+Vth within the write period Tw.

Figure 8:
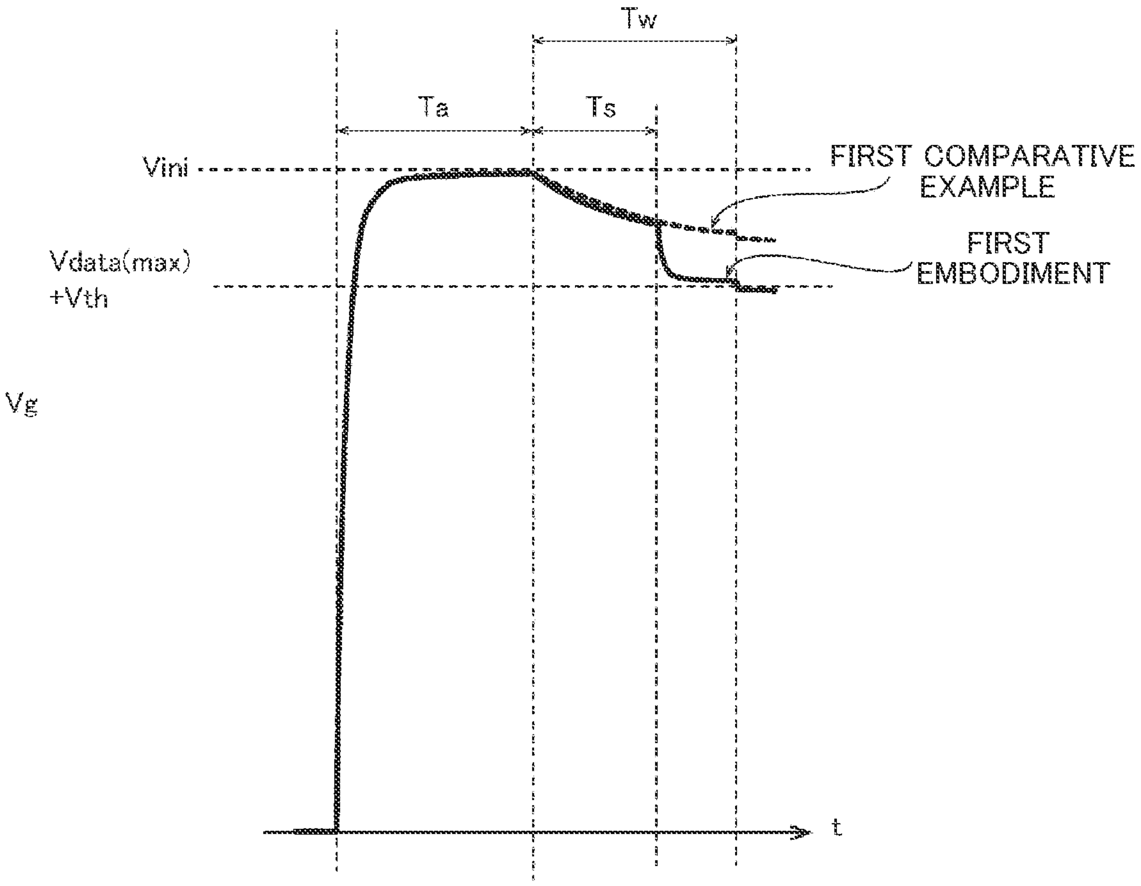
FIG. 8 is a table showing variations in gate voltage when a data signal in an example according to the first embodiment and a data signal according to the first comparative example have maximum values Vdata(max).
Figure 9:
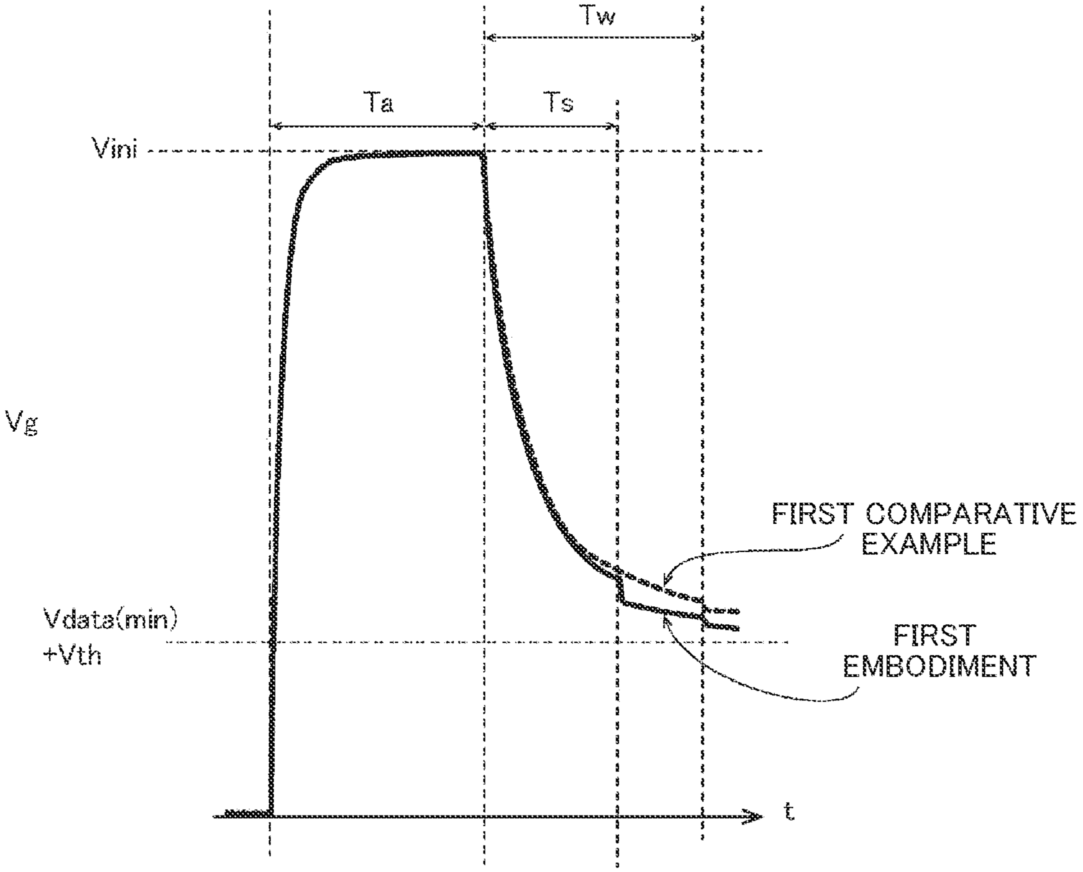
FIG. 9 is a table showing variations in gate voltage when the data signal in the example according to the first embodiment and the data signal according to the first comparative example have minimum values Vdata(min).

Result of Comparison Between Example of First Embodiment and First Comparative Example Described next will be a result of comparison between an example of the display device 100 according to the first embodiment and a display device according to a first comparative example. Note that the examples below show numerical examples. However, the numerical examples are given for the purpose of description, and the present disclosure shall not be limited to these numerical examples. Furthermore, FIG. 8 is a table showing variations in gate voltage when a data signal in an example according to the first embodiment and a data signal according to the first comparative example have maximum values Vdata(max). FIG. 9 is a table showing variations in gate voltage when the data signal in the example according to the first embodiment and the data signal according to the first comparative example have minimum values Vdata(min). Note that, in the examples below, a relationship of Vdata(min)=0 V holds.

First Comparative Example

Figure 6:
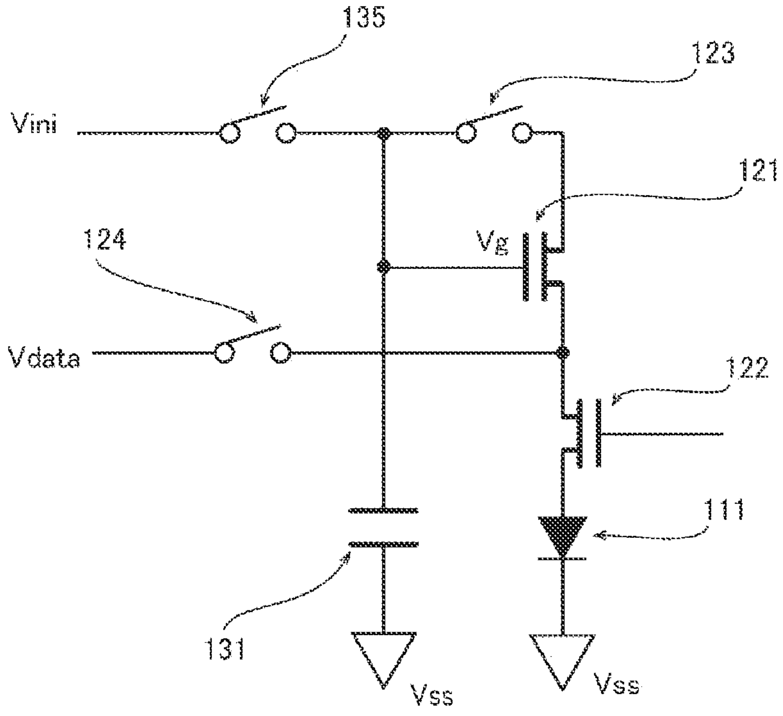
FIG. 6 is a circuit diagram illustrating a display device according to a first comparative example.
Figure 7:
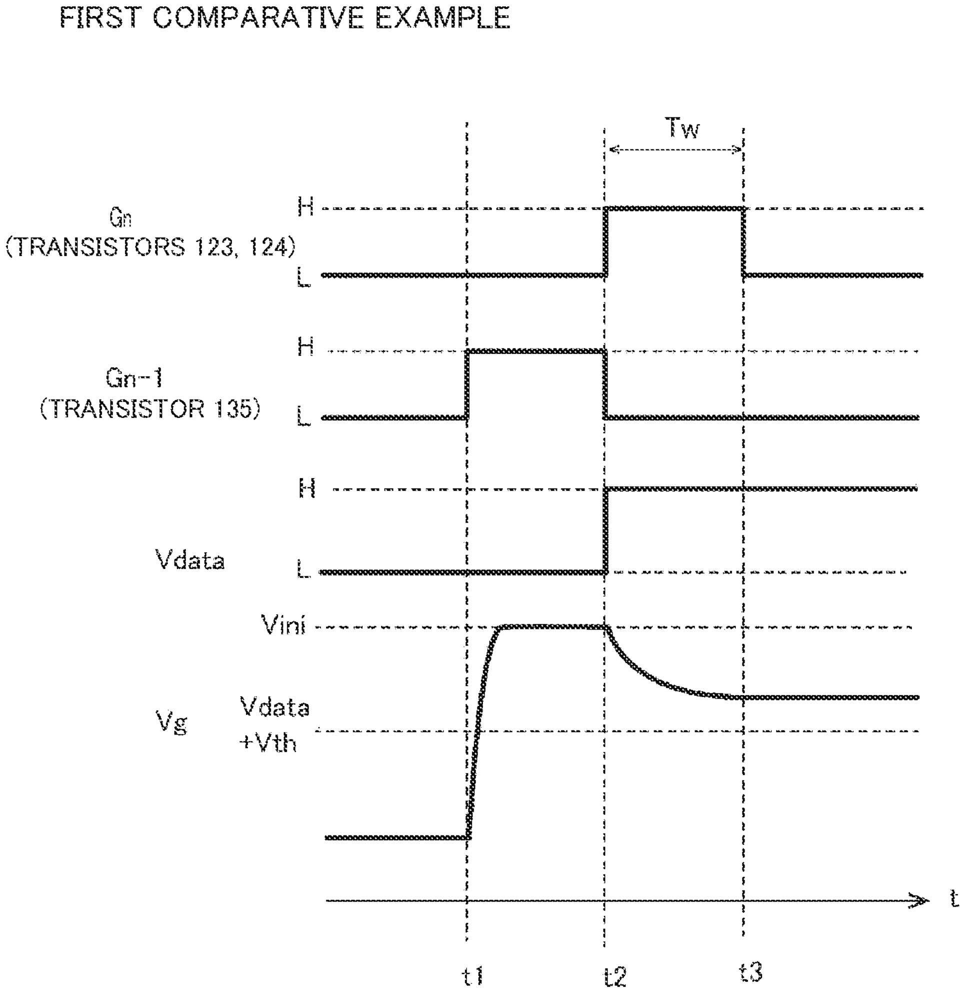
FIG. 7 is a timing diagram showing an operation of the display device according to the first comparative example.

As illustrated in FIG. 6, the display device according to the first comparative example includes: a light-emitting element 111; transistors 121 to 124 and 135; and a capacitive element 131. The capacitive element 131 is connected to a gate electrode of the transistor 121. Furthermore, as shown in FIG. 7, the gate voltage Vg of the transistor 121 rises to the voltage Vini from the time point t1 to the time point t2, and falls toward Vdata+Vth at the time point t2. However, even at the time point t3 at which the write period Tw ends, the gate voltage Vg does not reach Vdata+Vth. The reason will be described below.

For ease of calculation, a source-drain resistance and a source-drain wiring resistance are assumed to be 0 when the transistor 124 and the transistor 123 are ON. Here, a source-drain current can be expressed as Equation (2) below, and an initial value Vg(0) of the gate voltage Vg can be expressed as Equation (3) below.

$$I=\alpha\times(Vg-(Vdata+Vth))2. \tag{2}$$

$$Vg(0)=Vini. \tag{3}$$

Here, a relationship of α=1/2×μ×W/L×C0 holds. As to the gate voltage Vg(t), t=0 shows that the write period starts at to.

Wherein Cs is a capacitance of the capacitive element 131, q(0) is charges accumulated in the capacitive element 131 in the initial period, and a relationship of Vss=0 holds, relationships of Equations (4) and (5) hold.

$$I=dq/dt. \tag{4}$$

$$q(0)-q(t)=Cs\times(Vg(t)-Vss). \tag{5}$$

Thus, a relationship of Equation (6) holds.

$$I=-Cs\times dVg/dt. \tag{6}$$

Then, because of Equations (2) and (6), a relationship of Equation (7) holds when β is a constant.

$$Vg(t)=Vdata+Vth+1/(\alpha/Cs\times t+\beta). \tag{7}$$

When Equation (3) of Vg(0)=Vini is substituted into Equation (7), Equation (8) is $$B=1/(Vini-(Vdata+Vth)). \tag{8}$$

Equation (7) shows that Vg is inversely proportional to the time t. Furthermore, when the time t is infinite, Vg converges to Vdata+Vth. However, the actual length of the write period is finite. For example, if the display device has a resolution of full high definition (FHD) and a refresh rate of 60 Hz, the write period is 16 μs. If the refresh rate is 120 Hz, the write period is 8 μs.

For example, if Cs=10 pF and α=7×10$^{-6}$ are substituted into Equation (7) above, Vg is represented by dotted lines in the graphs shown in FIGS. 8 and 9. That is, Vg does not reach Vdata+Vth within the write period Tw. Furthermore, although omitted in the above equations, the transistors included in the display unit have on-resistance and wiring resistance. Hence, the time period for Vg to reach Vdata+Vth is actually longer than the time period in the examples shown in FIGS. 8 and 9.

Example of First Embodiment

In the first embodiment, the charges flow from the gate electrode 21*g* to the capacitive element 31 until the standby period Ts has elapsed within the write period Tw. After the standby period Ts has elapsed, the charges flow also from the gate electrode 21*g* to the capacitive element 32. Such a feature allows the write operation to be carried out faster in the first embodiment than in the first comparative example. The reason will be described below with reference to numerical examples.

Here, wherein Cs1 is a capacitance of the capacitive element 31 and Cs2 is a capacitance of the capacitive element 32, a combined capacitance Cs can be expressed as Equation (9) below.

$$Cs = Cs1 + Cs2. \tag{9}$$

Then, charges Q(t) accumulated in the combined capacitance Cs in the write period Tw can be expressed as Equation (10) below.

$$Q(Tw) = Cs \times Vg(Tw). \tag{10}$$

When Equation (7) above is substituted into Equation (10), Equation (11) is obtained.

$$Q(Tw) = Cs \times \left(Vdata + Vth + 1/(\alpha/Cs \times Tw + \beta)\right). \tag{11}$$

Furthermore, the charges to be written to the capacitive element 31 and to the capacitive element 32 are charges Q(t) written for an infinite (∞) time period. Hence a relationship of Equation (12) below holds.

$$Q(\infty) = Cs \times Vg(\infty). \tag{12}$$

Because Vg(∞) is Vdata+Vth, Equation (12) is expressed as Equation (13) below.

$$Q(\infty) = Cs \times (Vdata + Vth). \tag{13}$$

Hence, excess charges Qs not released from Cs in Tw can be expressed by Equation (14) obtained from Equations (11) and (13).

$$Qs = Q(Tw) - Q(\infty) = Cs/(\alpha/Cs \times Tw + \beta). \tag{14}$$

For example, Vdata is 4.5 V to 0 V, Vth is 1 V, and Tw is 16 μs. Moreover, if Vdata=4.5 V and Vini=6 V are substituted into Equation (14), Qs is obtained as follows.

$$Qs\,(4.5\text{V}) = Cs/(\alpha/Cs \times Tw + \beta) = 10[pF]/(7 \times 10-6/10[pF] \times 16 \times 10-6 + 1/(6-(4.5+1))) = 0.75[pC].$$

Note that the voltage difference between Vg and Vdata+Vth at the end of the write period Tw is 0.82 [pC]/10 [pF]≈0.08 V.

Furthermore, if Vdata=0 V is substituted into Equation (14), Qs is obtained as follows.

$$Qs\,(0\text{V}) = 10[pF]/(7 \times 10-6/10[pF] \times 16 \times 10-6 + 1/(6-(0+1))) = 0.88[pC].$$

From the above example, Qs is 0.75 [pC] to 0.88 [pC]. Note that, in the example of the first embodiment, the value of Vini is set higher than Vdata(max)+Vth by 0.5 V.

In the example of the first embodiment, the initialization is performed (i.e., Vini is applied) only to the capacitive element 31 (Cs1), and only the capacitive element 31 (Cs1) is connected to the gate electrode 21*g* (the voltage Vg) until the standby period Ts has elapsed. After the standby period Ts has elapsed, the capacitive element 32 (Cs2) is connected to the gate electrode 21*g* (Vg). Hence, the display device 100 performs control to flow the excess electric charges to the capacitive element 32 (Cs2).

As to Equation (14), if the charge Qs when Vdata(max) is applied is Qsa, a relationship of β=1/(Vini−(Vdata(max)+Vth)) holds. Hence Equation (15) is obtained.

$$Qsa = Cs/(\alpha/Cs \times Tw + 1/((Vini - (Vdata(\max) + Vth))). \tag{15}$$

A value of Cs2 is set so that the capacitance can store Qsa, where a relationship of Vini=Vdata(max)+Vth+0.5 V holds. Hence, Cs2 and Cs1 can be expressed by the equations below.

$$Cs2 = Qsa/(Vdata(\max) + Vth) = Cs/\{(\alpha/Cs \times Tw + 1/0.5) \times (Vdata(\max) + Vth)\}.$$

$$Cs1 = Cs - Cs2 = Cs(1 - 1/\{(\alpha/Cs \times Tw + 1/0.5) \times (Vdata(\max) + Vth)\}).$$

For example, if relationships of Cs=10 pF, $\alpha=7\times10^{-6}$, Vth=1 V, Vdata(max)=4.5 V, and Tw=16 us hold, Cs1 and Cs2 are obtained as follows.

Cs1=9.86 [pF], and

Cs2=0.14 [pF].

Next, the timing (the standby period Ts) for writing Cs2 is timing when the charges of Cs1 are represented as Q(∞)+4/3×Qsa. That is, if the timing is Ts, Equation (16) below is $$Q(Ts) = Q(\infty) + 4/3 \times Qsa, \tag{16}$$

wherein Ts=9.85 μs.

That is, in the above example, if relationships of Cs1=9.86 [pF], Cs2=0.14 [pF], and Ts=9.85 us hold, Vg reaches Vdata(max)+Vth within the write period Tw. Note that even if Vg does not reach Vdata(max)+Vth because of, for example, wiring resistance, the change of voltages from GH to GL in the gate signal acts on the capacitance between the gate and the drain of the transistor 23 at the end of the write period Tw. Hence, Vg further drops as shown in FIGS. 8 and 9.

(Result of Comparison)

Described below is a comparison between the example of the first embodiment and the first comparative example. In the example of FIG. 8, the first comparative example shows that the gate voltage Vg has not reached Vdata+Vth yet when the write period Tw ends. Whereas, the example of the first embodiment shows that the gate voltage Vg has reached Vdata+Vth when the write period Tw ends. In the example of FIG. 9, the first comparative example shows that the gate voltage Vg has not reached Vdata+Vth yet when the write period Tw ends. When the write period Tw ends, a value of the gate voltage Vg seen in the example of the first embodiment is closer to Vdata+Vth than a value of the gate voltage Vg seen in the first comparative example. As a result, compared with the first comparative example, the example of the first embodiment successfully reduces luminance variations caused by a transistor that controls a current flowing in a light-emitting element.

Second Embodiment

Described next with reference to FIGS. 10 to 12 will be a configuration of a display device 200 according to a second embodiment. In the second embodiment, transistors included in the display device 200 are p-channel transistors. In the description below, the same reference signs as those in the first embodiment denote the same configurations as those in the first embodiment, and the preceding description will be referred to unless otherwise specified.

Figure 10:
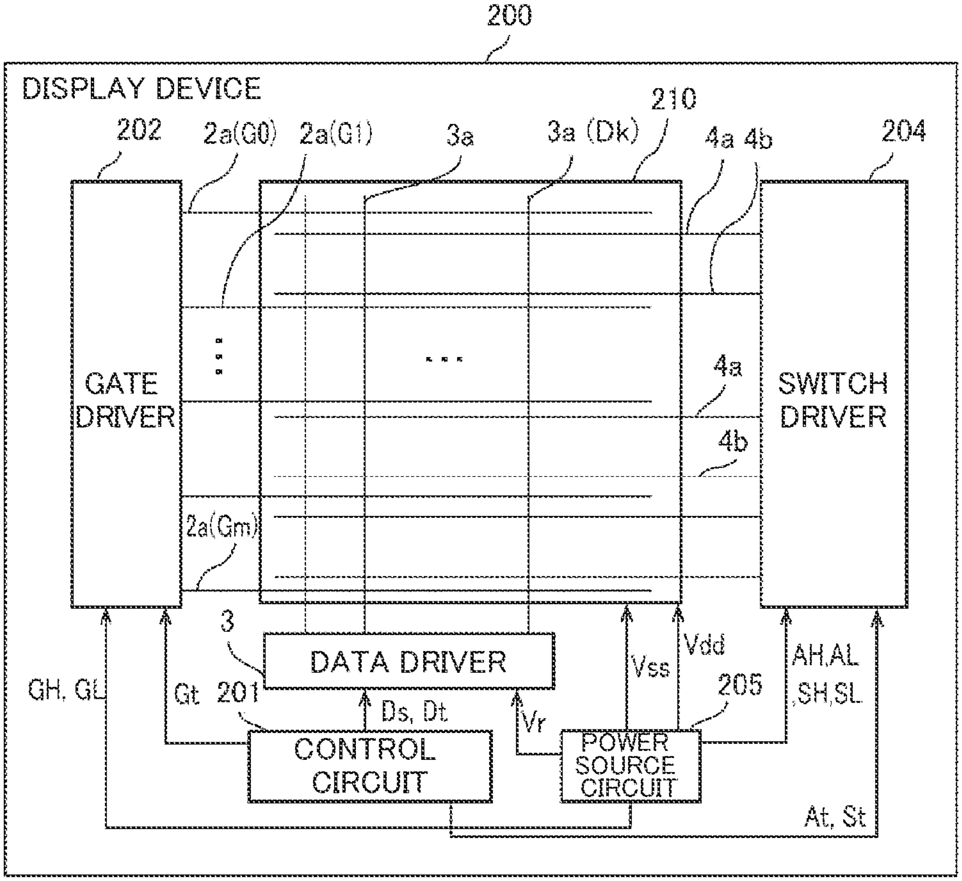
FIG. 10 is a block diagram illustrating a configuration of a display device 200 according to a second embodiment.

As illustrated in FIG. 10, the display device 200 according to the second embodiment includes: a control circuit 201; a gate driver 202; a switch driver 204; a power source circuit 205; and a display unit 210.

Figure 11:
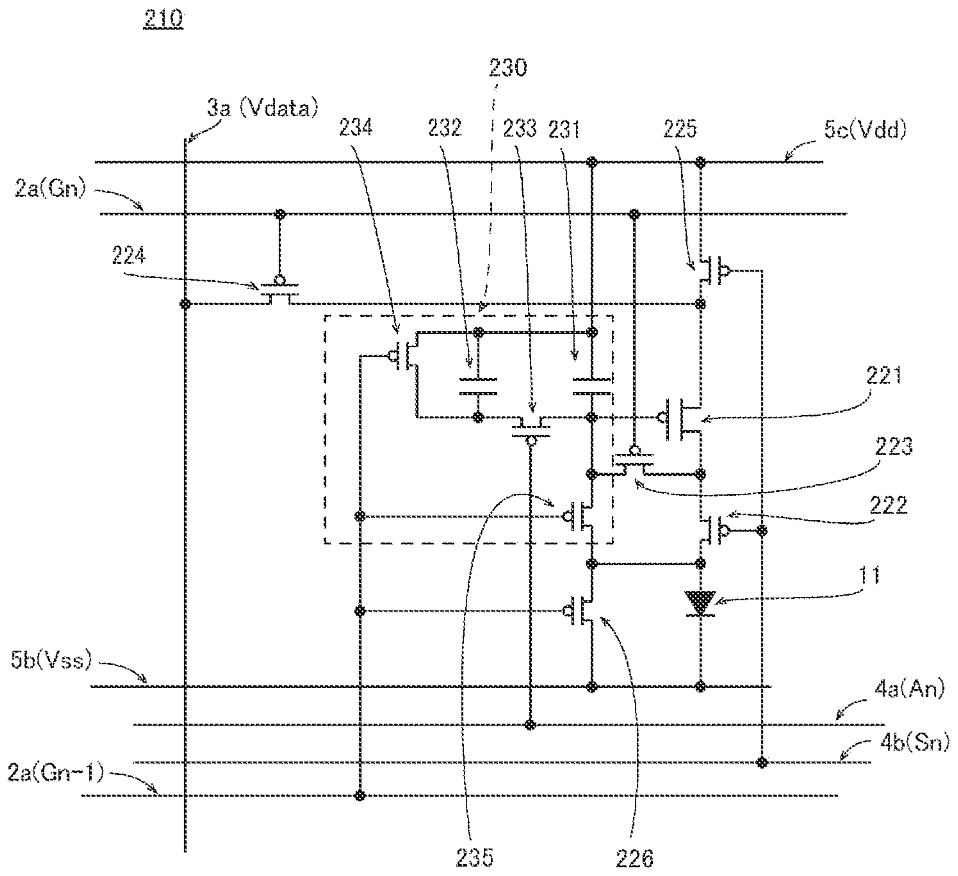
FIG. 11 is a circuit diagram illustrating a configuration of a display unit 210 according to the second embodiment.

As illustrated in FIG. 11, the display unit 210 includes: transistors 221 to 226; and a voltage compensation circuit 230. The voltage compensation circuit 230 includes: the capacitive elements 231 and 232; and transistors 233 to 235. In the second embodiment, the transistors 221 to 226 and 233 to 235 are p-channel transistors. Note that the same arrangement (connection) relationship between the transistors 21 to 26 of the first embodiment and the transistors 221 to 226 will not be elaborated upon. Differences between the transistors 221 to 226 and the transistors 21 to 26 will be described.

The capacitive elements 231 and 232 and the transistor 234 are connected to the power line 5*c* to which the voltage Vdd is applied. The transistor 235 is connected through the transistor 226 to the power line 5*b* to which the voltage Vss is applied.

Figure 12:
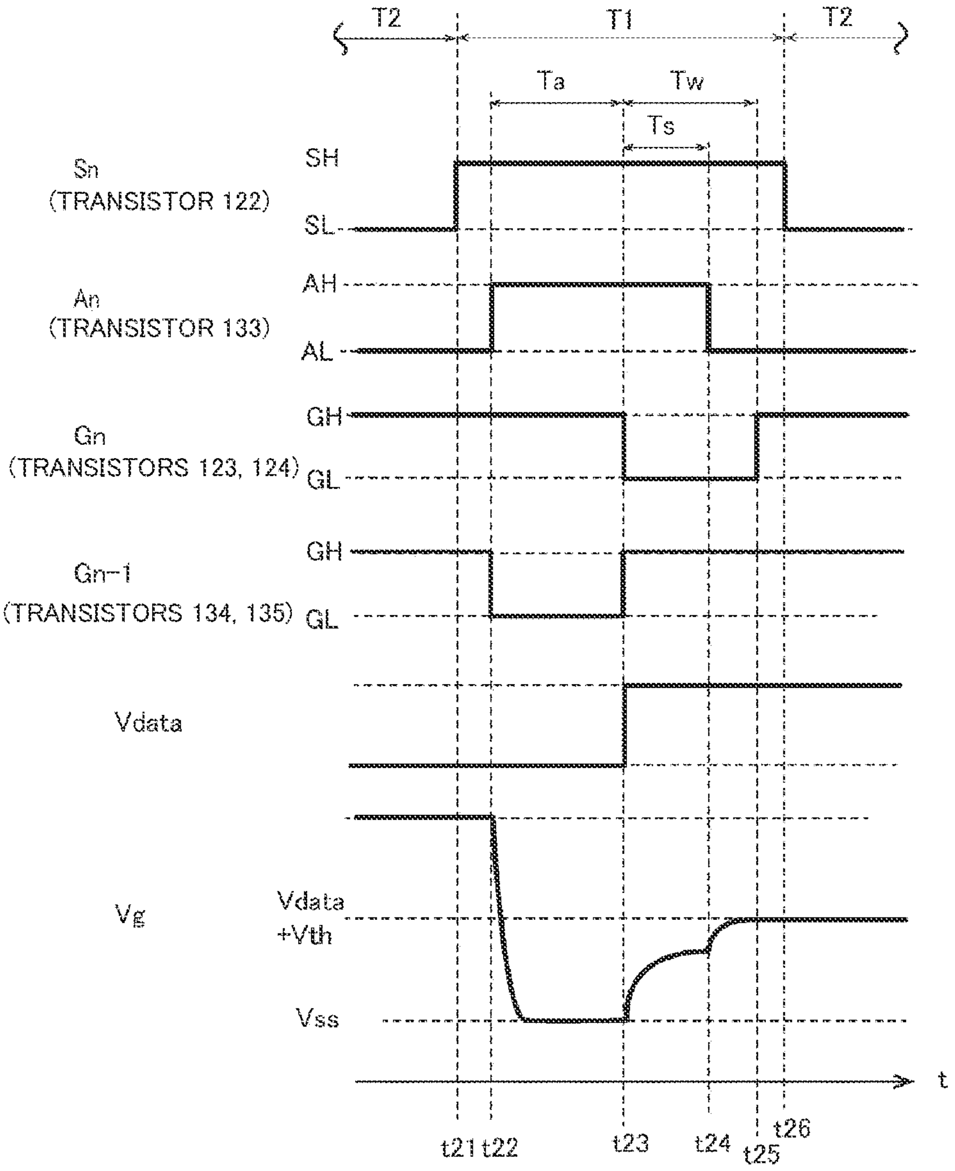
FIG. 12 is a timing diagram showing an operation of the display device 200 according to the second embodiment.

As illustrated in FIG. 12, the gate driver 202 applies: the voltage GL to the n−1-th gate line 2*a* (Gn−1) in the initial period Ta; and the voltage GL to the n-th gate line 2*a* (Gn) in the write period Tw. Furthermore, the switch driver 204 supplies: the voltage SH in the light OFF period T1; and the voltage SL in the light ON period T2. Moreover, the switch driver 204 supplies: the voltage AH in the initial period Ta and the standby period Ts; and the voltage AL in another period.

As shown in FIG. 12, the light OFF period T1 starts at a time point t21. Then, at a time point t22, the initial period Ta starts, and the voltage Vss is applied to a gate electrode of the transistor 221. At a time point t23, the write period Tw and the standby period Ts start. The gate electrode of the transistor 221 is electrically disconnected from the power line 5*b* (Vss), and the charges from the capacitive element 231 flow to the gate electrode. Hence, at a time point t24, the standby period Ts ends. The transistor 233 connects the capacitive element 231 and the capacitive element 232 together in parallel with respect to the gate electrode. Hence, the gate voltage of the transistor 221 rises toward Vdata+Vth. At a time point t25, the write period Tw ends. At a time point t26, the light ON period T2 starts.

The voltage Vss is set lower than the voltage Vdata(max) by Vth. Furthermore, unlike the first embodiment, the voltage Vdata(max) exhibits the lowest voltage value among the voltage values of the data signals. Vth to be selected has a voltage value higher than the highest voltage value (Vth (max)) among the variations of the gate threshold values of the transistors in the display unit 210. Furthermore, Vss is set to a value lower than the Vth by V0. That is, Vss is set to satisfy Equation (21) below. For example, a relationship of voltage V0≈0.5 V holds.

$$Vss = Vdd - (Vdata(\max) + Vth(\max) + V0). \tag{21}$$

Figure 13:
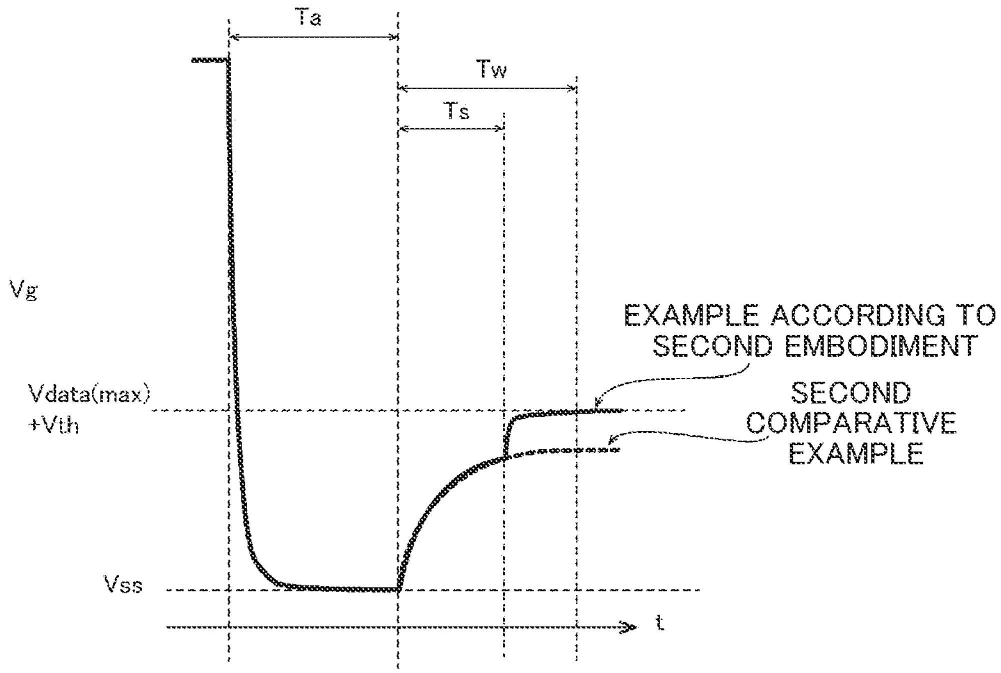
FIG. 13 is a table showing variations in gate voltage when a data signal in an example according to the second embodiment and a data signal according to a second comparative example have Vdata(max) (i.e., the value indicating the maximum luminance)
Figure 14:
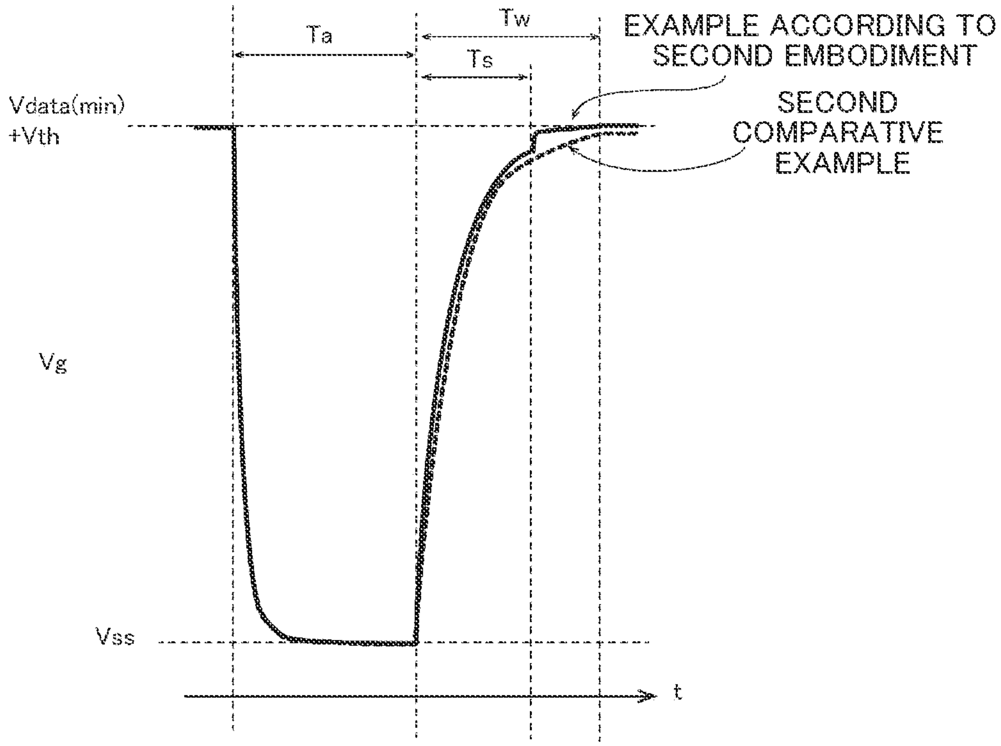
FIG. 14 is a table showing variations in gate voltage when the data signal in the example according to the second embodiment and the data signal according to the second comparative example have Vdata(min) (i.e., the value indicating the minimum luminance)

Result of Comparison Between Example of Second Embodiment and Second Modification Next, with reference to FIGS. 13 and 14, a result of comparison is described between an example of the display device 200 according to the second embodiment and a second modification. A display device according to the second modification has a configuration of the first comparative example whose n-channel transistors are replaced with p-channel transistors. FIG. 13 is a table showing variations in gate voltage when a data signal in an example according to the second embodiment and a data signal according to a second comparative example have Vdata (max) (i.e., the value indicating the maximum luminance). FIG. 14 is a table showing variations in gate voltage when the data signal in the example according to the second embodiment and the data signal according to the second comparative example have Vdata(min) (i.e., the value indicating the minimum luminance).

In FIGS. 13 and 14, the second comparative example shows that the gate voltage Vg has not reached Vdata+Vth yet when the write period Tw ends. Whereas, the example of the second embodiment shows that the gate voltage Vg has reached Vdata+Vth when the write period Tw ends. As a result, compared with the second comparative example, the example of the second embodiment successfully reduces luminance variations caused by a transistor that controls a current flowing in a light-emitting element.

Third Embodiment

Next, with reference to FIGS. 2, 15, and 16, a configuration of a display device 300 according to a third embodiment will be described. In the third embodiment, after the end of the write period Tw, the capacitive element 31 and the capacitive element 32 are connected together in parallel with respect to a gate electrode. In the description below, the same reference signs as those in the first embodiment denote the same configurations as those in the first embodiment, and the preceding description will be referred to unless otherwise specified.

Figure 15:
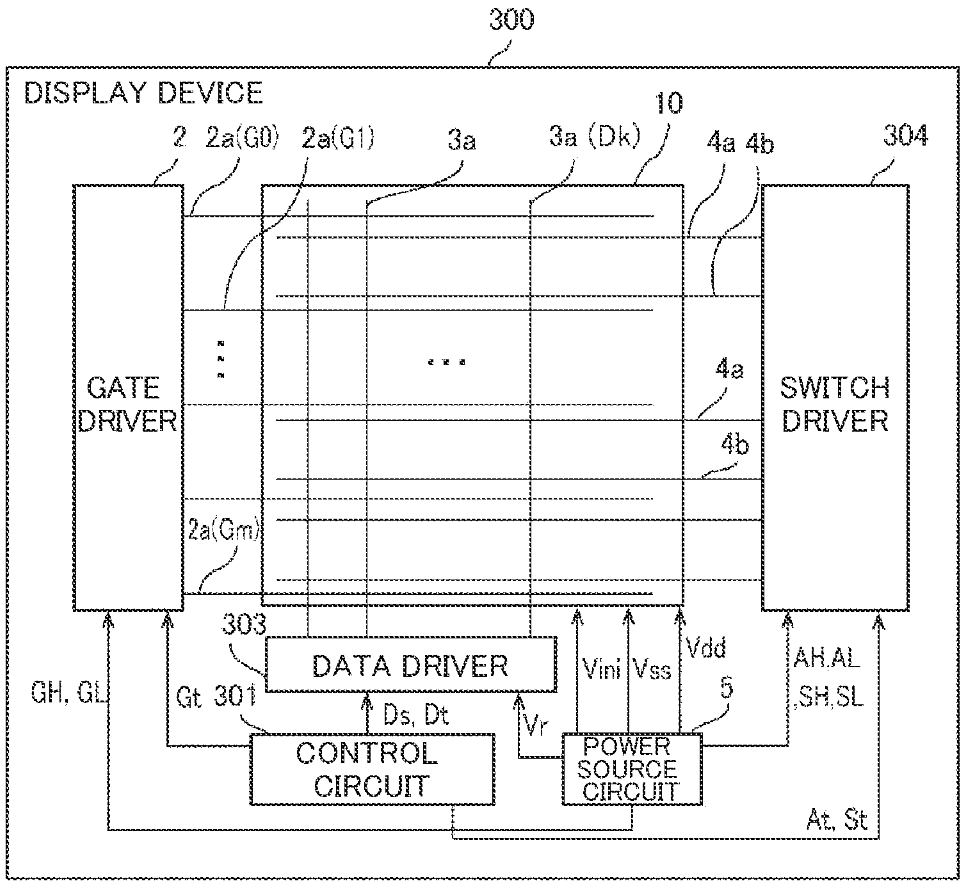
FIG. 15 is a block diagram illustrating a configuration of the display device 200 according to a third embodiment.
Figure 16:
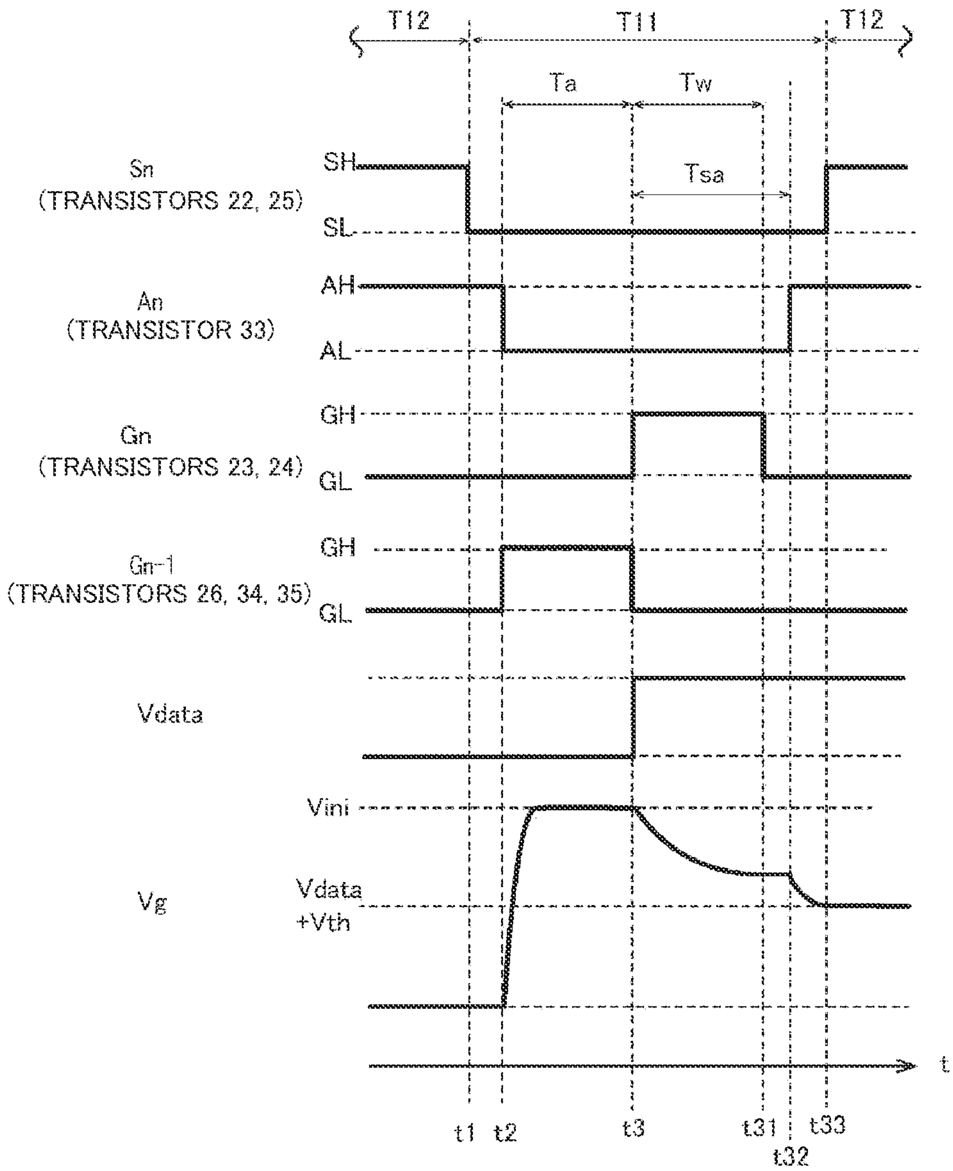
FIG. 16 is a timing diagram showing an operation of the display device 300 according to the third embodiment.

As illustrated in FIG. 15, the display device 300 according to the third embodiment includes: the display unit 10 (see FIG. 2); a control circuit 301; a data driver 303; and a switch driver 304. In the third embodiment, a standby period Tsa is set longer than the write period Tw. That is, the control circuit 301 changes the voltage of a control signal, which is output from the switch driver 304, from AL to AH at a time point t32 after a time point t31 when the write period Tw ends. Then, at a time point t33 after the time point t32, the control circuit 302 finishes a light OFF period T11 and starts a light ON period T12.

Hence, in the third embodiment, the charges flowing in the write between the gate electrode 21*g* and the capacitive element 31 stop flowing. Such a feature makes it possible to separately estimate a flow of charges between the gate electrode 21*g* and the capacitive element 31 and a flow of charges between the gate electrode 21*g* and the capacitive element 32, and to easily set capacitance of the capacitive element 32. The feature will be described below in more detail.

In the third embodiment, a relationship of Tsa>TW holds. If a time point t is when the write period Tw ends and a relationship of t=Tw holds, Equation (31) below is given.

$$Vg(Tw) = Vdata + Vth + 1/(\alpha/Cs1 \times Tw + \beta). \quad (31)$$

Hence, a difference ΔVg between the voltage Vg(Tw) and the voltage Vdata+Vth is expressed as Equation (32) below.

$$\Delta Vg = 1/(\alpha/Cs1 \times Tw + \beta). \quad (32)$$

Note that ΔVg does not depend on Vdata.

After the write, the capacitive element 32 is connected to the gate electrode 21*g*. Once a sufficient time period has passed, Vg has a value Vgp that can be expressed as Equation (33) below.

$$Vgp = Cs1/(Cs1 + Cs2) \times (Vdata + Vth + \Delta Vg). \quad (33)$$

Here, it is impossible to set Cs1 and Cs2 in a manner that Vgp=Vdata+Vth is set for all Vdata. Hence, the data driver 303 according to the third embodiment previously changes and determines an output voltage Vdatai so that a relationship of Vgp=Vdata+Vth holds, and outputs the determined voltage.

A Vdata voltage for an R grayscale is represented by Vdata(R). R is an integer of 0≤R≤255 for 8 bits, and is an integer of 0≤R≤1023 for 10 bits. When the R grayscale is represented by Vdata(R), the target voltage Vgd(R) is expressed as Equation (34) below.

$$Vgd(R) = Vdata(R) + Vth. \quad (34)$$

In order to convert the voltage, output from the data driver 303, into a data voltage to be input to the transistor 21, a voltage Vdatai(R) is input for the R grayscale. Here, the obtained voltage Vgp(R) is expressed as Equation (35).

$$Vgp(R) = Cs1/(Cs1 + Cs2) \times (Vdatai(R) + Vth + \Delta Vg). \quad (35)$$

Hence, in order to determine the Vdatai(R) so that a relationship of Vgd(R)=Vgp(R) holds, Equations (36) below has to be satisfied.

$$Vdata(R) + Vth = Cs1/(Cs1 + Cs2) \times (Vdatai(R) + Vth + \Delta Vg), \quad (36)$$

and $$Vdatai(R) = (Cs1 + Cs2)/Cs1 \times Vdata(R) + Cs2/Cs1 \times Vth - \Delta Vg.$$

In accordance with these conversion equations, the grayscale R is converted by the control circuit 301, or the Vdata voltage is converted by the data driver 303. In the conversion, if the voltage cannot be set to the matching Vdata, the data driver 303 sets the voltage to the value closest to Vdata.

Note that the capacitances of the capacitive element 31 and the capacitive element 32 according to the third embodiment are set to values that satisfy Vdatai(0)=Vdata (0) when, for example, the grayscale is 0. In this case, Equation (37) below is given.

$$Cs2 = Cs1 \times \Delta Vg/(Vdata(0) + Vth). \quad (37)$$

Thanks to the third embodiment, the correction accuracy of the write signal does not depend on the input grayscale, such that the correction can be accurately performed.

Modifications

The embodiments described above are mere examples for implementing the present disclosure. Hence, the present disclosure shall not be limited to the above embodiments, and the above embodiments can be appropriately modified and implemented unless otherwise departing from the scope of the present disclosure.

(1) The first and third embodiments show an example in which all of the transistors are n-channel transistors, and the second embodiment shows an example in which all of the transistors are p-channel transistors. However, the present disclosure shall not be limited to such examples. That is, some of the transistors may be n-channel transistors, and the other transistors may be p-channel transistors.

(2) The first to third embodiments show an example in which the light-emitting element is a uLED, a mini LED, or an organic EL element (OLED). However, the present disclosure shall not be limited to such an example. For example, the light-emitting element may be an LED other than a uLED, a mini LED, or an OLED.

(3) The first to third embodiments show an example in which the first electrode is a source electrode and the second electrode is a drain electrode. However, the present disclosure shall not be limited to such an example. The first electrode may be a drain electrode, and the second electrode may be a source electrode.

Furthermore, the above configurations can de described below.

A display device according to a first configuration of the present disclosure includes: a light-emitting element; a first transistor controlling a current flowing in the light-emitting element; a second transistor connected between the light-emitting element and a first electrode that is one of a source electrode of the first transistor or a drain electrode of the first transistor; a third transistor connected between a gate electrode of the first transistor and a second electrode that is another one of the source electrode of the first transistor or the drain electrode of the first transistor; a drive circuit supplying the data signal to the first electrode in a write period succeeding the initial period, and turning ON the third transistor a data signal to the first electrode; and a voltage compensation circuit connected to the gate electrode of the first transistor. The drive circuit: supplies, in an initial period, an initial voltage to the gate electrode of the first transistor, the initial voltage being different in voltage value from a voltage of the data signal; and supplies the data signal to the first electrode in a write period succeeding the initial period, and turns ON the third transistor. The voltage compensation circuit includes: a first capacitive element connected to the gate electrode; a second capacitive element connected to the first capacitive element; a first switch connected to the gate electrode and to the second capacitive element, and turning ON to electrically connect together the first capacitive element and the second capacitive element in parallel; and a second switch switching between: a state in which the gate electrode of the first transistor and a voltage source that supplies the initial voltage are electrically connected together; and a state in which the gate electrode of the first transistor and the voltage source are electrically disconnected from each other. The voltage compensation circuit: switches, when the write period starts, from the state in which the second switch is ON to electrically connect together the gate electrode of the first transistor and the voltage source to the state in which the second switch is OFF to electrically disconnect the gate electrode of the first transistor and the voltage source from each other; and turns ON the first switch after the write period starts. The drive circuit turns ON the second transistor in a light ON period succeeding the turning ON of the first switch (the first configuration).

According to the first configuration, after the write period starts, the charges can flow from the gate electrode of the first transistor to the second capacitive element. The charges flowing into the second capacitive element can quickly decrease the potential of the gate electrode of the first transistor. The quick decrease in the potential of the gate electrode can bring the potential close to a value of the sum of the voltage of the data signal and the gate threshold voltage of the first transistor. Such a feature can reduce luminance variations caused by a transistor that controls a current flowing in the light-emitting element.

In the first configuration, the voltage compensation circuit may start to turn ON the first switch after the write period starts and within the write period (a second configuration).

According to the second configuration, the potential of the gate electrode can be brought close, within the write period, to a value of the sum of the voltage of the data signal and the gate threshold voltage of the first transistor. As a result, compared with a case where the potential of the gate electrode is brought close, after the end of the write period, to a value of the sum of the voltage of the data signal and the gate threshold voltage of the first transistor, the second configuration allows the light-emitting element to start emitting light quickly.

In the first configuration, the voltage compensation circuit may start to turn ON the first switch after the write period ends and before the light ON period starts (a third configuration).

According to the third configuration, after the charges finish moving from the gate electrode to the first capacitive element in the write period, the charges can move from the gate electrode to the second capacitive element. Hence, compared with a case where the charges move in the write period from the gate electrode to both the first capacitive element and the second capacitive element, the distance (the time period) of the charges moving from the gate electrode to the second capacitive element can be easily estimated when the display device is designed.

In any one of the first to third configurations, the voltage compensation circuit may further include a third switch short-circuiting the second capacitive element in a period before the write period starts (a fourth configuration).

According to the fourth configuration, before the charges move from the gate electrode to the second capacitive element, the charges remaining in the second capacitive element can dissipate in advance. As a result, the fourth configuration can prevent a limitation of the charges moving from the gate electrode to the second capacitive element because of the remaining charges.

In any one of the first to fourth configuration, the first capacitive element may be larger in capacitance than the second capacitive element (a fifth configuration).

The fifth configuration can reduce a time period for moving the charges from the gate electrode to the second capacitive element.

As to a method for controlling a display device according to a second aspect, the display device includes: a light-emitting element; a first transistor configured to control a current flowing in the light-emitting element; a second transistor connected between the light-emitting element and a first electrode that is one of a source electrode of the first transistor or a drain electrode of the first transistor; a third transistor connected between a gate electrode of the first transistor and a second electrode that is another one of the source electrode of the first transistor or the drain electrode of the first transistor; a drive circuit supplying a data signal to the first electrode; and a voltage compensation circuit connected to the gate electrode of the first transistor. The voltage compensation circuit includes: a first capacitive element connected to the gate electrode; a second capacitive element connected to the first capacitive element; a first switch connected to the gate electrode and to the second capacitive element, and turning ON to electrically connect together the first capacitive element and the second capacitive element in parallel; and a second switch switching between: a state in which the gate electrode of the first transistor and a voltage source that supplies an initial voltage are electrically connected together; and a state in which the gate electrode of the first transistor and the voltage source are electrically disconnected from each other, the initial voltage being different in voltage value from a voltage of the data signal, The method includes: supplying, in an initial period, the initial voltage to the gate electrode of the first transistor; supplying the data signal to the first electrode in a write period succeeding the initial period, and turning ON the third transistor, switching, when the write period starts, from the state in which the second switch is ON to electrically connect together the gate electrode of the first transistor and the voltage source to the state in which the second switch is OFF to electrically disconnect the gate electrode of the first transistor and the voltage source from each other, turning ON the first switch after the write period starts, and turning the second switch ON in a light ON period succeeding after the turning ON of the first switch (a sixth configuration).

The sixth configuration can provide a method for controlling a display device capable of reducing luminance variations caused by a transistor that controls a current flowing in a light-emitting element.

What is claimed is:

1. A display device, comprising:

a light-emitting element;

a first transistor configured to control a current flowing in the light-emitting element;

a second transistor connected between the light-emitting element and a first electrode that is one of a source electrode of the first transistor or a drain electrode of the first transistor;

a third transistor connected between a gate electrode of the first transistor and a second electrode that is another one of the source electrode of the first transistor or the drain electrode of the first transistor;

a drive circuit configured to supply a data signal to the first electrode; and a voltage compensation circuit connected to the gate electrode of the first transistor, wherein the drive circuit is further configured to:

supply, in an initial period, an initial voltage to the gate electrode of the first transistor, the initial voltage being different in voltage value from a voltage of the data signal, supply the data signal to the first electrode in a write period succeeding the initial period, and turn ON the third transistor, the voltage compensation circuit includes:

a first capacitive element connected to the gate electrode, a second capacitive element connected to the first capacitive element, a first switch connected to the gate electrode and to the second capacitive element, and configured to turn ON to electrically connect together the first capacitive element and the second capacitive element in parallel, and a second switch configured to switch between:

a state in which the gate electrode of the first transistor and a voltage source that supplies the initial voltage are electrically connected to each other, and a state in which the gate electrode of the first transistor and the voltage source are electrically disconnected from each other, the voltage compensation circuit is configured to:

switch, when the write period starts, from a state in which the second switch is ON to electrically connect together the gate electrode of the first transistor and the voltage source, to a state in which the second switch is OFF to electrically disconnect the gate electrode of the first transistor and the voltage source from each other, and turn ON the first switch after the write period starts, the drive circuit is further configured to turn ON the second transistor in a light ON period succeeding the turning ON of the first switch, and the voltage compensation circuit further includes a third switch configured to short-circuit the second capacitive element in a period before the write period starts.

2. The display device according to claim 1, wherein the voltage compensation circuit is further configured to turn ON the first switch after the write period starts and within the write period.

3. The display device according to claim 2, wherein the voltage compensation circuit is further configured to turn ON the first switch after the write period ends and before the light ON period starts.

4. The display device according to claim 3, wherein the first capacitive element is larger in capacitance than the second capacitive element.

5. A display device, comprising:

a light-emitting element;

a first transistor configured to control a current flowing in the light-emitting element;

a second transistor connected between the light-emitting element and a first electrode that is one of a source electrode of the first transistor or a drain electrode of the first transistor;

a third transistor connected between a gate electrode of the first transistor and a second electrode that is another one of the source electrode of the first transistor or the drain electrode of the first transistor;

a drive circuit configured to supply a data signal to the first electrode; and a voltage compensation circuit connected to the gate electrode of the first transistor, wherein the drive circuit is further configured to:

supply, in an initial period, an initial voltage to the gate electrode of the first transistor, the initial voltage being different in a voltage value from a voltage of the data signal, supply the data signal to the first electrode in a write period succeeding the initial period, and turn ON the third transistor, the voltage compensation circuit includes:

a first capacitive element connected to the gate electrode, a second capacitive element connected to the first capacitive element, a first switch connected to the gate electrode and to the second capacitive element, and configured to turn ON to electrically connect together the first capacitive element and the second capacitive element in parallel, and a second switch configured to switch between:

a state in which the gate electrode of the first transistor and a voltage source that supplies the initial voltage are electrically connected to each other, and a state in which the gate electrode of the first transistor and the voltage source are electrically disconnected from each other, the voltage compensation circuit is configured to:

switch, when the write period starts, from a state in which the second switch is ON to electrically connect together the gate electrode of the first transistor and the voltage source, to a state in which the second switch is OFF to electrically disconnect the gate electrode of the first transistor and the voltage source from each other, and turn ON the first switch after the write period starts, the drive circuit is further configured to turn ON the second transistor in a light ON period succeeding the turning ON of the first switch, and the voltage compensation circuit is further configured to turn ON the first switch after the write period ends and before the light ON period starts.

6. The display device according to claim 5, wherein the first capacitive element is larger in capacitance than the second capacitive element.

* * * * *